(12) United States Patent
Ling

(10) Patent No.: US 12,092,190 B2
(45) Date of Patent: Sep. 17, 2024

(54) DISPLACEMENT PLANETARY CARRIER SYSTEM AND PLANETARY TRANSMISSION DEVICE THEREOF

(71) Applicant: AICI TECHNOLOGY (NINGBO) CO., LTD., Zhejiang (CN)

(72) Inventor: Zilong Ling, Shenzhen (CN)

(73) Assignee: AICI TECHNOLOGY (NINGBO) CO., LTD., Ningbo (CN)

(*) Notice: Subject to any disclaimer, the term of this patent is extended or adjusted under 35 U.S.C. 154(b) by 0 days.

(21) Appl. No.: 18/626,968

(22) Filed: Apr. 4, 2024

(65) Prior Publication Data

US 2024/0247704 A1 Jul. 25, 2024

Related U.S. Application Data

(63) Continuation of application No. PCT/CN2021/124464, filed on Oct. 18, 2021.

(51) Int. Cl.
| | |
|---|---|
| F16H 1/28 | (2006.01) |
| F16H 1/46 | (2006.01) |
| F16H 57/08 | (2006.01) |

(52) U.S. Cl.
CPC ............ F16H 1/2863 (2013.01); F16H 1/46 (2013.01); F16H 57/082 (2013.01)

(58) Field of Classification Search
CPC ......... F16H 1/2863; F16H 1/46; F16H 57/082
See application file for complete search history.

(56) References Cited

U.S. PATENT DOCUMENTS

2014/0309071 A1* 10/2014 Croce ................ F16H 57/082
475/331

FOREIGN PATENT DOCUMENTS

| CN | 105156594 | A | | 12/2015 |
|---|---|---|---|---|
| CN | 109505965 | A | | 3/2019 |
| CN | 109882585 | A | * | 6/2019 |
| CN | 209743560 | U | | 12/2019 |
| CN | 112709788 | A | | 4/2021 |
| CN | 112955676 | A | | 6/2021 |
| CN | 116292857 | B | * | 10/2023 |
| DE | 102012210465 | A1 | | 12/2013 |
| JP | 02283939 | A | | 11/1990 |

(Continued)

OTHER PUBLICATIONS

International Search Report of PCT/CN2021/124464.
Written Opinion of PCT/CN2021/124464.

*Primary Examiner* — Justin Holmes

(57) ABSTRACT

A displacement planetary carrier system, which consists of an elastic planetary carrier (1), a rigid tapered sleeve (2) and a rigid tapered sleeve axial adjustment mechanism (3); the elastic planetary carrier (1) is a planetary carrier in which an inner surface of a side wall portion is processed into a tapered surface, and staggered notches (103) are processed on the side wall, so that the elastic planetary carrier (1) elastically deforms; the rigid tapered sleeve (2) is sleeved within the elastic planetary carrier (1), part of the outer side wall is processed with a tapered surface that matches with the tapered surface of the inner surface of the side wall of the elastic planetary carrier (1); the rigid tapered sleeve axial adjustment mechanism (3) is axially mounted on an adjusting bolt/nut or elastic element at an end portion of the elastic planetary carrier (1) and/or the rigid tapered sleeve (2).

45 Claims, 9 Drawing Sheets

(56) References Cited

FOREIGN PATENT DOCUMENTS

| JP | 2017009044 A | | 1/2017 | |
|----|----|----|----|----|
| KR | 20090017923 A | * | 2/2009 | |
| KR | 20140145340 A | * | 12/2014 | |
| WO | 2017032260 A1 | | 3/2017 | |
| WO | WO-2018152625 A1 | * | 8/2018 | ............... F16H 1/28 |

* cited by examiner

DISPLACEMENT PLANETARY CARRIER SYSTEM AND PLANETARY TRANSMISSION DEVICE THEREOF

CROSS-REFERENCE TO RELATED APPLICATION

This Application is a bypass application of PCT Application No: PCT/CN2021/124464. This application claims priority from PCT Application No. PCT/CN2021/124464, filed Oct. 18, 2021, the content of which is incorporated herein in the entirety by reference.

TECHNICAL FIELD

The present disclosure relates to a planetary transmission device, in particular to a displacement planetary carrier system and a planetary transmission device containing the displacement planetary carrier system.

BACKGROUND

A planetary gear mechanism usually includes a planetary carrier, a sun gear, an inner gear ring and a planetary gear, the planetary gear is engaged with the sun gear and the inner gear ring, and an auto-rotating shaft of the planetary gear is supported by the planetary carrier. There is a 3K type planetary transmission device among many planetary gear mechanisms. The 3K type planetary transmission device can be a 3K-I type, a 3K-II or a 3K-III type planetary transmission device, including a single planetary gear type and a compound planetary gear type. There have been many articles on a structure, setting of gear parameters and calculation of a transmission ratio of the 3K type planetary transmission device, which are general technical knowledge in the field of planetary gear transmission, especially in the recent 50 years, domestic and foreign researchers have given details on various structures, tooth profiles and other technical parameters of the 3K type planetary transmission device in many articles. In transmission with the number of planetary gears greater than 2, the planetary carrier is usually of a space frame structure formed by connecting two annular side plates 1, 2 (or called double walls) through supporting columns (also called connecting plates) evenly distributed therebetween. The number of the supporting columns is equal to the number of the planetary gears, and transverse dimensions of the supporting columns are determined by dimensions of the planetary gears. Bearings of the planetary gears are usually installed in the planetary gears, in some cases where the diameters of the planetary gears are small due to the small transmission ratio, so that the bearings are designed to be arranged in the side plates in order to ensure certain service life of the bearings of the planetary gears.

Moreover, the problem of backlashes will become more and more serious with abrasion of gear surfaces caused by use of the gears since the problems of low transmission precision, large backlashes, low uniform load performance and the like will be generated due to processing errors and assembly errors of the gears in a traditional planetary transmission device.

Therefore, it is necessary to provide a transmission device which can solve the problem of backlashes caused by abrasion of the gear surfaces or the processing errors so as to prolong the service life and improve the transmission precision of the planetary transmission device.

SUMMARY

In order to overcome the above defects, the present disclosure provides a displacement planetary carrier system and a planetary transmission device containing the displacement planetary carrier system. The planetary transmission device can make planetary gears get close to inner gear rings through expansion of a planetary carrier, certain prepressure is provided while narrowing backlashes between the planetary gears and the inner gear rings, which is conducive to improving transmission precision and uniform load performance and relieving gear surface abrasion caused by the use of the gears, the displacement planetary carrier system can continuously displace to prolong the service life of the transmission device, and the service life of the transmission device is significantly prolonged especially in the application field with high requirements for backlashes such as robots. In addition, with long-time abrasion of the gears and continuous displacement adjustment, the planetary gears and the inner gear rings are mutually ground during the meshing process, so that the meshing of the planetary gears and the inner gear rings is closer to perfect, thereby reducing vibration generated during transmission with abrasion generated during use.

The objective of the present disclosure is achieved by the following technical solution:

In a first aspect, the present disclosure relates to a displacement planetary carrier system, consisting of an elastic planetary carrier, a rigid tapered sleeve and a rigid tapered sleeve axial adjustment mechanism; wherein the elastic planetary carrier is a planetary carrier in which part of an inner surface of a side wall is processed into tapered surfaces, the elastic planetary carrier includes first spaces for containing planetary gears, a shaft or shaft hole for mounting the planetary gear is formed in at least one axial end of each first space, staggered notches are processed in the side wall, except for the first spaces, of the elastic planetary carrier, and the notches are used for elastically increasing a perimeter of the side wall of the elastic planetary carrier during force bearing, so that the elastic planetary carrier elastically deforms;

the rigid tapered sleeve is sleeved within the elastic planetary carrier, and tapered surfaces that match with the tapered surface of the inner surface of the side wall of the elastic planetary carrier are processed on at least part of an outer side wall of the rigid tapered sleeve, so that the outer surface, processed with the tapered surfaces, of the rigid tapered sleeve is in close fit with the inner surface, processed with the tapered surface, of the side wall of the clastic planetary carrier; and the rigid tapered sleeve axial adjustment mechanism is axially mounted on an adjusting bolt/nut or elastic element at an end portion of the elastic planetary carrier and/or the rigid tapered sleeve and used to apply axial force directed towards a minor diameter of the rigid tapered sleeve to the rigid tapered sleeve, the planetary gears arranged in the elastic planetary carrier expand outward and press against inner gear rings that mesh with the same by axially pushing, by the axial adjustment mechanism, the rigid tapered sleeve to expand the clastic planetary carrier, so as to increase orbital radii of the planetary gears, thereby eliminating backlashes or applying gear surface prepressure between the planetary gears and the inner gear rings.

Furthermore, at least one pair of staggered notches in an axial direction or radial direction of the elastic planetary carrier are processed in the side wall, provided with the tapered surface, of the elastic planetary carrier, the two staggered notches are opposite, and a depth sum of each pair of staggered notches is greater than wall thicknesses before the notches are processed in notch positions of the elastic planetary carrier.

Furthermore, second spaces matched with the first spaces are further arranged on the side wall of the rigid tapered sleeve and used for containing the planetary gears and/or sun gears.

Furthermore, the axial adjustment mechanism is an elastic leaf, an outer edge of the elastic leaf is fixed to an end face of the elastic planetary carrier through a screw, an inner edge of the elastic leaf makes contact with a major diameter end face of the rigid tapered sleeve, and pressure towards the minor diameter of the rigid tapered sleeve is generated to the rigid tapered sleeve through elastic force of the elastic leaf.

Furthermore, a limiting mechanism is further arranged and used for limiting the rigid tapered sleeve and the elastic planetary carrier to circumferentially rotate relative to each other.

Furthermore, at least one protrusion or groove is formed in the major diameter end face of the rigid tapered sleeve as the limiting mechanism, and a groove or protrusion corresponding to the limiting mechanism is arranged at a corresponding position of the elastic leaf and clamped with the protrusion or groove of the rigid tapered sleeve, so as to limit the rigid tapered sleeve and the elastic planetary carrier to circumferentially rotate relative to each other.

Furthermore, a taper angle of the rigid tapered sleeve is less than 16°, preferably 6° to 12°, thereby achieving a self-locking effect.

Furthermore, the axial adjustment mechanism is an adjusting nut, an external thread matched with the adjusting nut is processed on a minor diameter end portion of the rigid tapered sleeve, the adjusting nut is screwed into the external thread of the rigid tapered sleeve, so as to compress the end face of the elastic planetary carrier, and tension towards the minor diameter of the rigid tapered sleeve is generated to the rigid tapered sleeve by means of tension of the adjusting nut.

Furthermore, the elastic planetary carrier includes an annular supporting top plate and an annular supporting bottom plate, both of which are symmetrically arranged, a plurality of planetary carrier supporting columns are arranged on an upper surface of the supporting bottom plate, and the annular supporting top plate is arranged at tops of the planetary carrier supporting columns; tapered surfaces are processed on inner surfaces of the supporting columns, the annular supporting top plate and the annular supporting bottom plate respectively; and a pair of staggered notches in the radial direction of the elastic planetary carrier are processed at a position, on each supporting column, of the elastic planetary carrier.

In a second aspect, the present disclosure discloses a planetary transmission device containing the above-mentioned displacement planetary carrier system, the planetary transmission device is a 3K type planetary transmission device, planetary gears of the planetary transmission device expand outward and press against inner gear rings of the planetary transmission device by axially pushing, by an axial adjustment mechanism, a rigid tapered sleeve to expand the elastic planetary carrier, so as to increase orbital radii of the planetary gears, thereby eliminating backlashes or applying gear surface prepressure between the planetary gears and the inner gear rings.

In a third aspect, the present disclosure discloses a planetary transmission device containing the above-mentioned displacement planetary carrier system, the planetary transmission device is a 3K type planetary transmission device without a sun gear, and the displacement planetary carrier system of the planetary transmission device serves as an input end; and planetary gears of the planetary transmission device expand outward and press against inner gear rings of the planetary transmission device by axially pushing, by an axial adjustment mechanism, a rigid tapered sleeve to expand the elastic planetary carrier, so as to increase orbital radii of the planetary gears, thereby eliminating backlashes or applying gear surface prepressure between the planetary gears and the inner gear rings.

In a fourth aspect, the present disclosure discloses a planetary transmission device containing the above-mentioned displacement planetary carrier system, the planetary transmission device is further provided with an additional sun gear and at least two additional third planetary gears on the basis of a 3K type planetary transmission device without sun gears, an additional sun gear and at least two third planetary gears are in engaged transmission to drive the third planetary gears to rotate, each third planetary gear and one planetary gear of the planetary transmission device are coaxially mounted and relatively fixed, and the additional sun gear of the planetary transmission device serves as an input end; and planetary gears of the planetary transmission device expand outward and press against inner gear rings of the planetary transmission device by axially pushing, by an axial adjustment mechanism, a rigid tapered sleeve to expand the elastic planetary carrier, so as to increase orbital radii of the planetary gears, thereby eliminating backlashes or applying gear surface prepressure between the planetary gears and the inner gear rings.

In a fifth aspect, the present disclosure discloses a planetary transmission device containing the above-mentioned displacement planetary carrier system, the planetary transmission device is a 2K-H type planetary transmission device containing an inner gear ring, a planetary gear of the planetary transmission device expands outward and press against the inner gear ring of the planetary transmission device by axially pushing, by an axial adjustment mechanism, a rigid tapered sleeve to expand the elastic planetary carrier, so as to increase an orbital radius of the planetary gear, thereby eliminating a backlash or applying gear surface prepressure between the planetary gear and the inner gear ring.

Compared with the prior art, the technical solution of the present disclosure has the following beneficial effects:

In the displacement planetary carrier system and the planetary transmission device containing the displacement planetary carrier system according to the present disclosure, the planetary transmission device can make the planetary gears get close to the inner gear rings through expansion of the planetary carrier, and certain prepressure is provided while narrowing the backlashes between the planetary gears and the inner gear rings, which is conducive to improving transmission precision and uniform load performance and relieving gear surface abrasion caused by the use of the gears; the displacement planetary carrier system can continuously displace to prolong the service life of the transmission device, and the service life of the transmission device is significantly prolonged especially in the application field with high requirements for backlashes such as robots; and in addition, with long-time abrasion of the gears and continuous displacement adjustment, the planetary gears and the inner gear rings are mutually ground during the meshing process, so that the meshing of the planetary gears and the inner gear rings is closer to perfect, thereby reducing vibration generated during transmission with abrasion generated during use.

Where,

| 1: elastic planetary carrier | 2: rigid tapered sleeve |
|---|---|
| 3: axial adjustment mechanism | 4: planetary gear |
| 5: sun gear | 6: first inner gear ring |
| 7: second inner gear ring | 8: displacement planetary carrier system |
| 9: first planetary gear | 10: second planetary gear |
| 11: inner gear ring | 12: first key slot |
| 101: planetary shaft hole | 102: supporting bottom plate |
| 103: notch | 104: planetary carrier supporting column |
| 105: supporting top plate | 106: threaded hole |
| 107: first space | 201: second space |
| 301: screw | 302: inner edge |
| 303: outer edge | 14: third planetary gear |
| 15: input shaft | 16: output shaft |
| 55: additional sun gear | 121: second key |
| 122: second key slot | |

DETAILED DESCRIPTION OF THE PRESENT DISCLOSURE

In order to make objectives, technical solutions, beneficial effects and significant progress of the present disclosure clear, the technical solutions in embodiments of the present disclosure will be clearly and completely described below with reference to the drawings provided in the embodiments of the present disclosure, apparently, all the described embodiments are merely part of the embodiments of the present disclosure, rather than all the embodiments. Based on demonstration made by the embodiments of the present disclosure, all other embodiments made by those ordinarily skilled in the art according to an existing planetary carrier shape, an existing 3K type planetary transmission device and an existing 2K—H type planetary transmission device containing inner gear rings on the premise of not involving inventive efforts belong to the scope of protection of the present disclosure.

It should be noted that terms "first", "second" and the like in the specification and claims of the present disclosure are merely used for distinguishing different objects instead of describing a specific sequence.

It should further be noted that the following specific embodiments can be combined, and the same or similar concepts or processes may not be repeated in certain embodiments.

Embodiment 1

Figure 1:
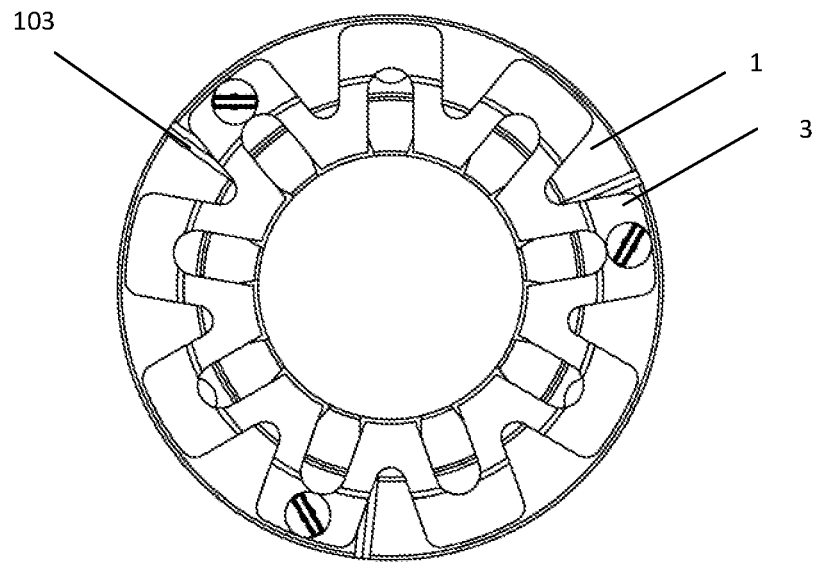
FIG. 1 is a front view of a displacement planetary carrier system in Embodiment 1 of the present disclosure.
Figure 2:
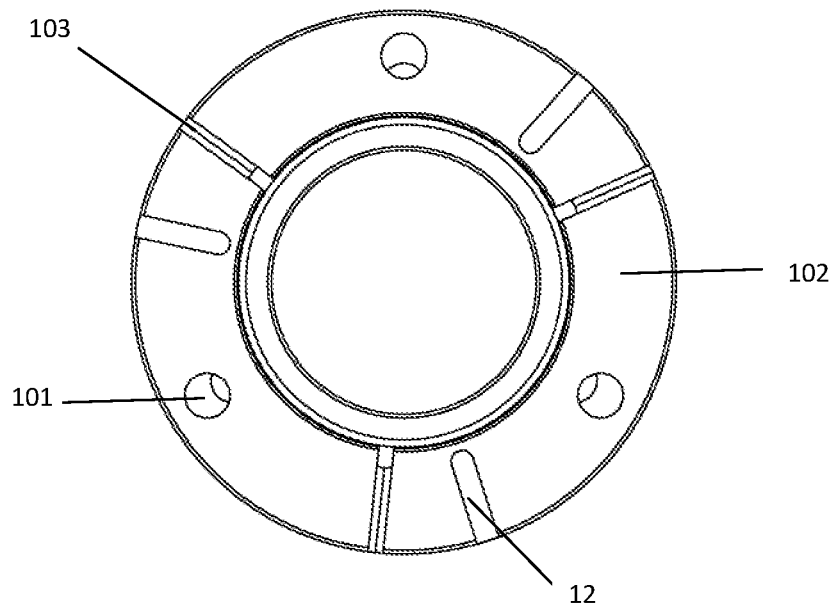
FIG. 2 is a rear view of a displacement planetary carrier system in Embodiment 1 of the present disclosure.
Figure 3:
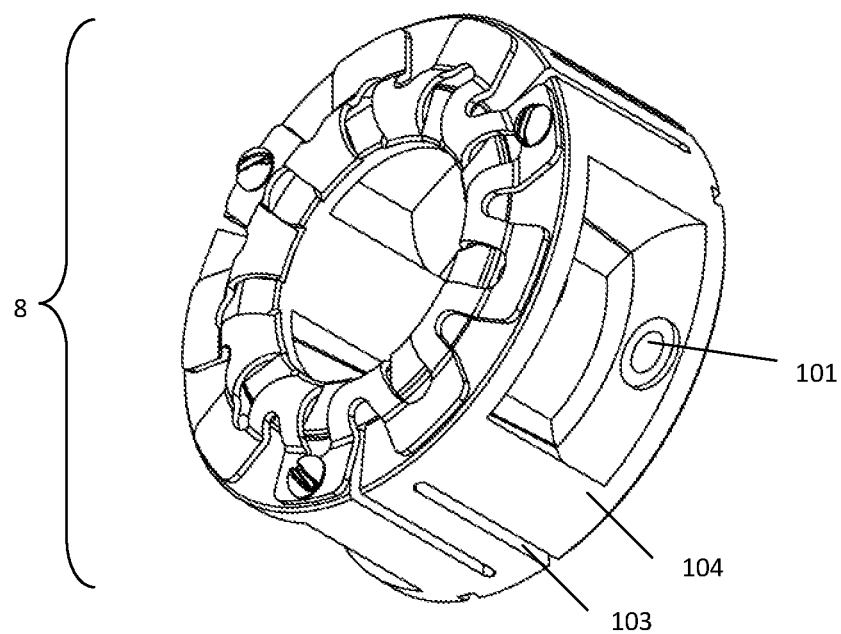
FIG. 3 is a stereogram of a displacement planetary carrier system in Embodiment 1 of the present disclosure.

As shown in FIGS. 1-3, a displacement planetary carrier system is provided. The displacement planetary carrier system 8 is a displacement planetary carrier system in a planetary reducer used in a robot or precision automation equipment for improving transmission precision, and consists of an elastic planetary carrier 1, a rigid tapered sleeve 2 and an axial adjustment mechanism 3. The displacement planetary carrier system is a system that can expand orbital radii of planetary gears in the elastic planetary carrier under axial movement of the rigid tapered sleeve in a minor diameter direction or keep applying outward expanding radial force to the planetary gears under axial force of the rigid tapered sleeve in the minor diameter direction, such that the planetary gears can press against inner gear rings that mesh with the same, reducing backlashes between the planetary gears and outer gear rings and improving the transmission precision. In the embodiment, the annular frame planetary carrier is of a double-side plate frame structure, and may also be selected from a single-side-plate structure so as to save space, and the displacement planetary carrier system cannot introduce any interference with the planetary gears or sun gears.

The elastic planetary carrier is of an annular structure with an annular inner wall, including an annular supporting top plate 105 and an annular supporting bottom plate 102, both of which are symmetrically arranged. Three planetary carrier supporting columns 104 are arranged on an upper surface of the supporting bottom plate 102, the annular supporting top plate 105 is arranged at a top of the planetary carrier supporting columns 104, tapered surfaces are processed on inner surfaces of the supporting columns 104, the annular supporting top plate 105 and the annular supporting bottom plate 102 respectively, three planetary shaft holes 101 are formed in a position, between every two planetary carrier supporting columns 104, of the supporting bottom plate 102 for the arrangement of the planetary gears, a pair of staggered notches 103 in an axial direction of the elastic planetary carrier are processed in a position, on each supporting column 104, of the planetary carrier, the two staggered notches are opposite, and a depth sum of each pair of staggered notches is greater than axial wall thicknesses before the notches are processed in notch positions of the elastic planetary carrier 1; and the notches 103 take the form of grooves. The notches are formed in order to achieve micro elastic deformation of the elastic planetary carrier 1, such that a perimeter of a side wall of the elastic planetary carrier is elastically increased, that is, radii of positions where the planetary gears are installed on the planetary carrier are increased, and the notches 103 may also be processed in a radial direction in addition to the above description. There are various structures that can achieve micro elastic deformation of the elastic planetary carrier 1, the above descriptions are only exemplary examples, however, the essence is to increase the annular perimeter, so that an annulus on the planetary carrier has not to be a complete perfect circle, various notches have to be processed to make the perimeter of the annulus increased, and in addition, the notches that can be stretched are preferably staggered from the planetary gears, which is conducive to evenly increasing distances between the planetary gears, and the planetary gears can better move in a radius direction without changing their distribution phases when the planetary carrier expands.

Three planetary shaft holes 101 corresponding to the planetary shaft holes in the supporting bottom plate and a plurality of threaded holes 106 for the installation of the axial adjustment mechanism are formed in an upper surface of the supporting top plate 105. A first space 107 is formed between every two planetary carrier supporting columns 104 of the elastic planetary carrier for containing the corresponding planetary gear.

Figure 4:
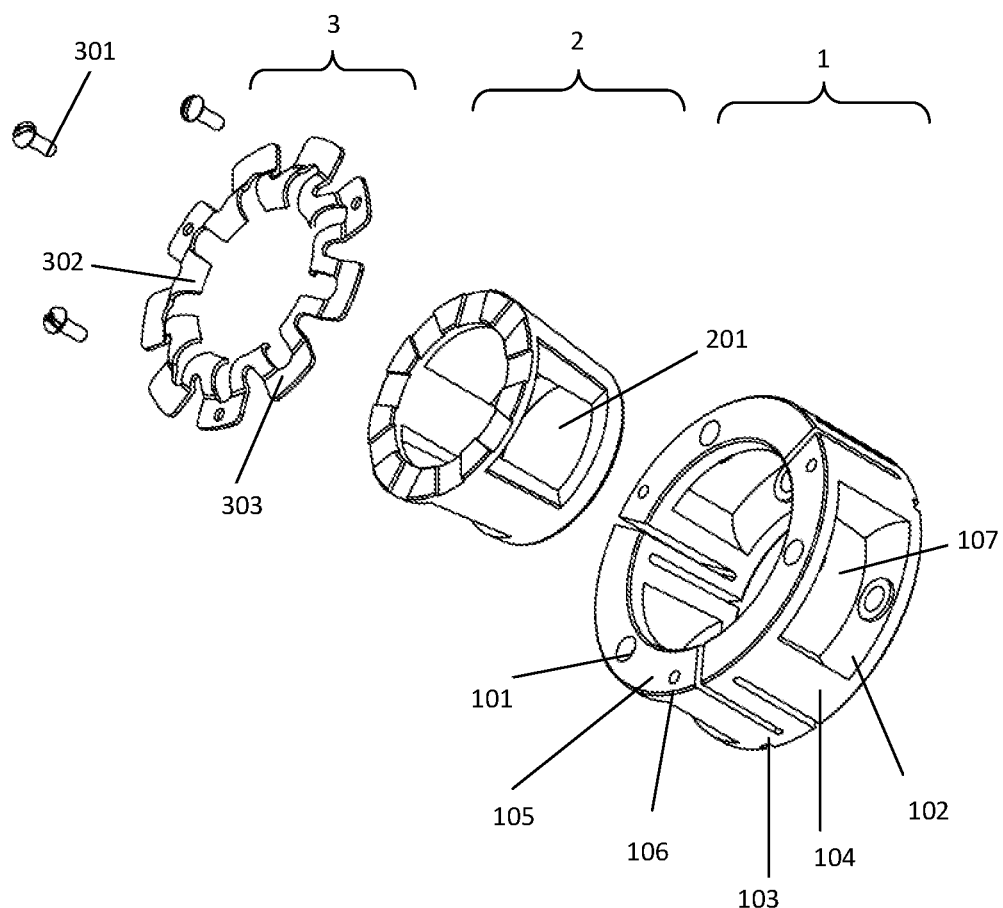
FIG. 4 is an exploded view of a displacement planetary carrier system in Embodiment 1 of the present disclosure.
Figure 5:
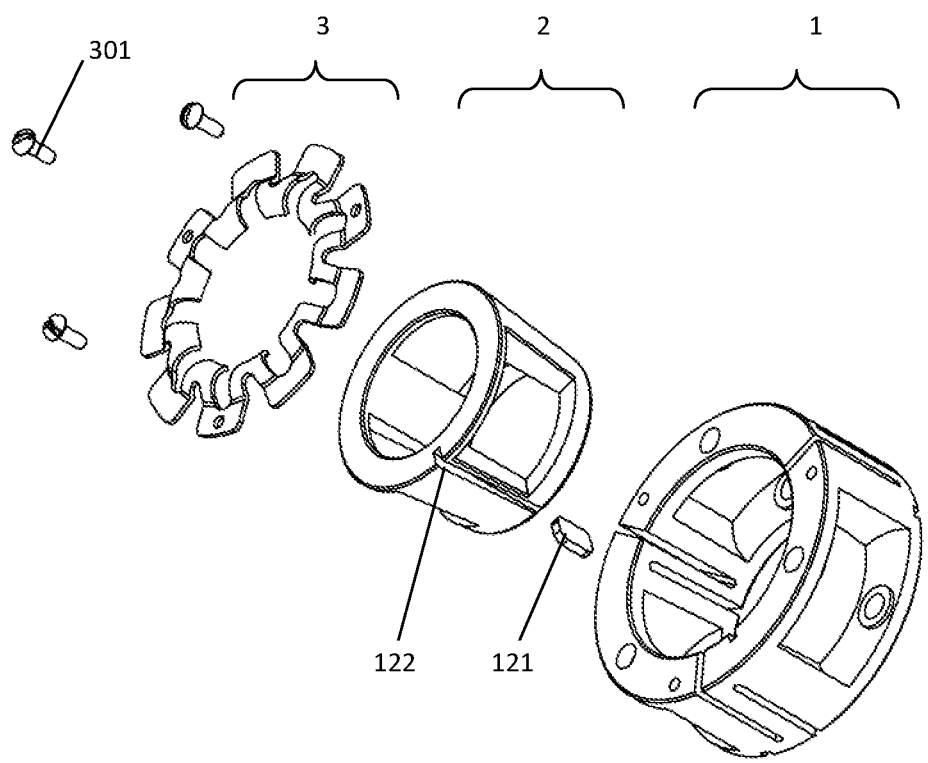
FIG. 5 is an exploded view of a displacement planetary carrier system with a key structure in Embodiment 1 of the present disclosure.

The rigid tapered sleeve 2 is of an annular structure, is sleeved within the elastic planetary carrier 1, and has an upper end portion and a lower end portion, both of which have different external diameters. The external diameter of the upper end portion is greater than that of the lower end portion, the lower end portion of the rigid tapered sleeve 2 is inserted into the elastic planetary carrier 1, and the upper end portion is directed towards the axial adjustment mechanism 3. Tapered surfaces that match with the tapered surfaces of the inner surface of the side wall of the elastic planetary carrier are processed on at least part of an outer side wall of the rigid tapered sleeve 2, so that the outer surface, processed with the tapered surfaces, of the rigid tapered sleeve is in close fit with the inner surface, processed with the tapered surfaces, of the side wall of the elastic planetary carrier. A protrusion or pit is arranged on an upper surface of the upper end portion as a limiting mechanism, and the limiting mechanism is limited by a corresponding limiting mechanism on the axial adjustment mechanism 3, so as to limit the rigid tapered sleeve 2 and the elastic planetary carrier 1 to circumferentially rotate relative to each other. As shown in FIGS. 4-5, spaced protrusions are arranged on the upper surface of the upper end portion, and sizes of the protrusions are matched with a shape of a lower surface of an inner edge 302 of the axial adjustment mechanism 3, so that the axial adjustment mechanism 3 and the rigid tapered sleeve 2 are clamped, thereby limiting the rigid tapered sleeve 2 and the elastic planetary carrier 1 from circumferentially rotating relatively. Optionally, simple clamping structures, such as keys for fixation, are arranged on contact surfaces of the elastic planetary carrier 1 and the rigid tapered sleeve 2 to limit relative circumferential rotation, so that interference with the planetary gears due to rotation of the rigid tapered sleeve is avoided. As shown in FIG. 5, a second key 121 is arranged on the inner wall of the elastic planetary carrier 1, a matched key slot 122 is formed in the outer wall of the elastic tapered sleeve, relative rotation of both is limited by adding the key, and meanwhile anti-torque rigidness of the elastic planetary carrier can also be improved by means of such key for fixation.

As shown in FIG. 2, optionally, three first key slots 12 are additionally processed in a bottom surface of the supporting bottom plate of the elastic planetary carrier 1 for transmitting torque. Since the planetary carrier can deform to expand, end face radial key slots or other similar structures are arranged on the planetary carrier to be used for still transmitting circumferential torque in a case of displacement of the planetary carrier.

Second spaces 201 matched with the first spaces 107 of the elastic planetary carrier 1 are processed on the outer side wall of the rigid tapered sleeve 2 and used for containing the planetary gears and/or the sun gears, and the second spaces 201 may be grooves or hollowed-out structures according to actual needs; and when it adapts to a reducer with the sun gears, the second spaces 201 are processed into the hollowed-out structures, and when it adapts to a reducer without the sun gears, the second spaces 201 may be processed into the grooves or the hollowed-out structures. The tapered surfaces that match with the tapered surfaces of the inner wall of the elastic planetary carrier 1 are processed at positions, except for the second spaces 201, of the outer side wall of the rigid tapered sleeve 2, so that the outer surface of the rigid tapered sleeve 2 is in close fit with the inner surface of the side wall of the elastic planetary carrier 1. A taper angle of the rigid tapered sleeve 2 is less than 16°, preferably 6° to 12°, so as to achieve a good self-locking effect, and the phenomenon that the planetary carrier shrinks and retracts, which is compensated by the axial adjustment of the tapered sleeve by springs when the planetary gears suffer from high-load radial component force is avoided.

The rigid tapered sleeve axial adjustment mechanism 3 is axially mounted on an adjusting bolt/nut or elastic element at an end portion of the elastic planetary carrier 1 and/or the rigid tapered sleeve 2 and used to apply axial force directed against the minor diameter of the rigid tapered sleeve to the rigid tapered sleeve, the planetary gears arranged in the elastic planetary carrier expand outward and press against the inner gear rings that mesh with the same by axially pushing, by the axial adjustment mechanism, the rigid tapered sleeve 2 to expand the elastic planetary carrier, so as to increase the orbital radii of the planetary gears, thereby eliminating backlashes or applying gear surface prepressure between the planetary gears and the inner gear rings. As shown in FIG. 4, the axial adjustment mechanism 3 is an elastic leaf, the elastic leaf includes an inner edge 302 and an outer edge 303, screw holes are formed in the outer edge 303 at intervals and matched with the threaded holes 106, and screws 301 penetrate through the screw holes and the threaded holes 106 so as to fix the rigid tapered sleeve axial adjustment mechanism 3 and the elastic planetary carrier 1; and the inner edge 302 of the elastic leaf makes contact with a major diameter end face of the rigid tapered sleeve 2, and pressure towards the minor diameter of the rigid tapered sleeve is generated to the rigid tapered sleeve 2 through elastic force of the elastic leaf. During specific use, the elastic leaf is installed after the planetary gears and the inner gear rings are installed.

Optionally, the rigid tapered sleeve axial adjustment mechanism 3 may also be separately selected from a thread structural form, such as an adjusting nut (different from the drawing of the present embodiment), an external thread matched with the adjusting nut is processed on a minor diameter end portion of the rigid tapered sleeve 2, the adjusting nut is screwed into the preset external thread of the rigid tapered sleeve 2, so that the adjusting nut compresses the end face of the elastic planetary carrier 1, and tension towards the minor diameter of the rigid tapered sleeve is generated to the rigid tapered sleeve by means of tension of the adjusting nut. During specific use, the adjusting screw is screwed after the planetary gears and the inner gear rings are installed, so as to avoid the situation that the planetary gears, expanding in advance, of the planetary carrier cannot be installed in the inner gear rings. During actual application, the rigid tapered sleeve 2 has a short stroke relative to an axial adjustment stroke of the elastic planetary carrier, for the reason that the expansion stroke of the planetary carrier is short, typically needed radius expansion does not go beyond half of thicknesses of the planetary gears, no large adjustment stroke needs to be designed for the adjustment of the tapered sleeve whether adopting screws or springs, a micro-displacement planetary carrier system can be designed under the condition of high precision grade of the parts of the planetary transmission device, and at this moment, it is only necessary to machine the notches 103 that can achieve a micro elastic deformation amount in the planetary carrier.

Figure 6:
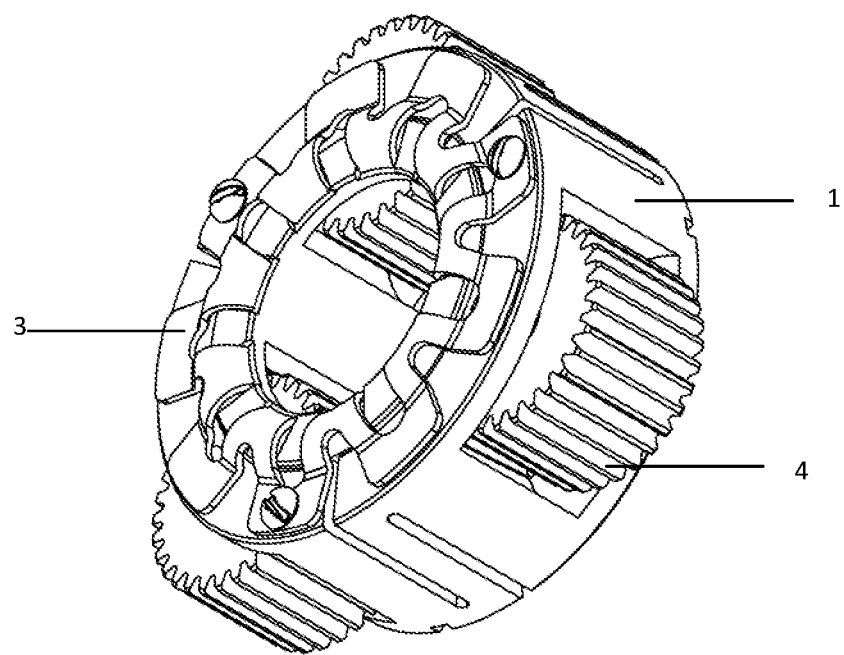
FIG. 6 is a schematic structural diagram of a displacement planetary carrier system assembled with planetary gears in Embodiment 1 of the present disclosure.

FIG. 6 is a schematic structural diagram of a displacement planetary carrier system assembled with planetary gears in Embodiment 1 of the present disclosure.

Embodiment 2

Figure 7:
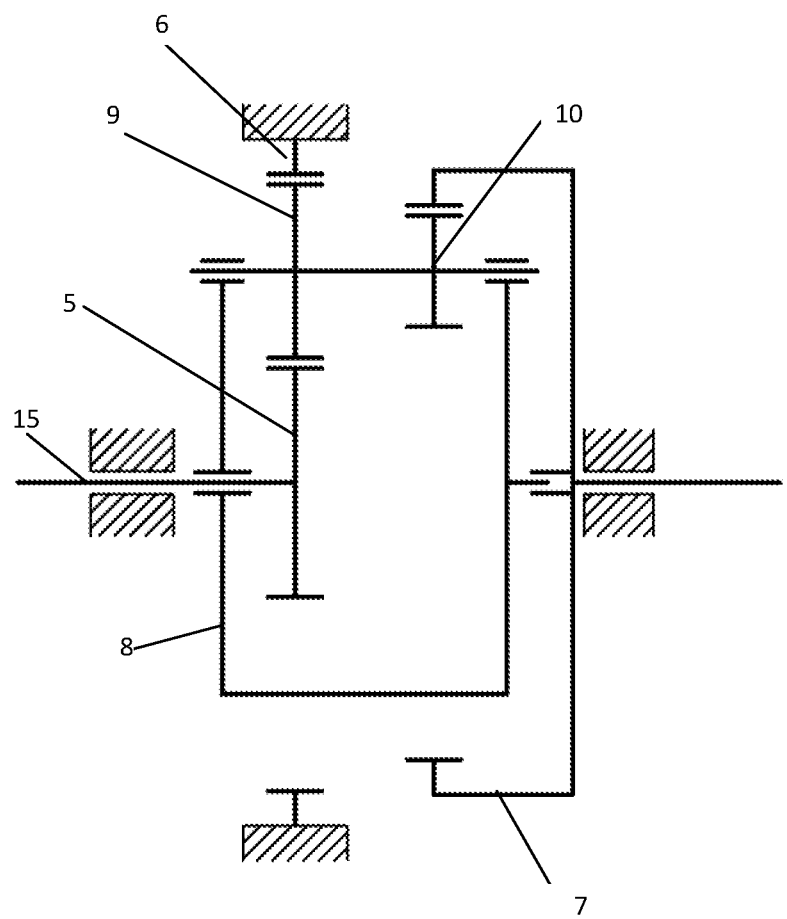
FIG. 7 is a simplified diagram showing a structural principle of a planetary transmission device in Embodiment 2 of the present disclosure.

As shown in FIG. 7, the present disclosure further discloses a planetary transmission device containing the displacement planetary carrier system. The planetary transmission device containing the displacement planetary carrier system is a 3K type planetary transmission device, including a first inner gear ring 6, a second inner gear ring 7, compound planetary gears 9, 10, a sun gear 5 and the displacement planetary carrier system 8, wherein the displacement planetary carrier system 8 consists of the elastic planetary carrier 1, the rigid tapered sleeve 2 and the rigid tapered sleeve axial adjustment mechanism 3 shown in FIGS. 4-5, and the compound planetary gears include a first planetary gear 9 and a second planetary gear 10. The first inner gear ring 6 is engaged with the first planetary gear 9, and the second inner gear ring 7 is engaged with the second planetary gear 10. A structure of the displacement planetary carrier system 8 is the same as that of Embodiment 1, which is not repeated here. Optionally, the planetary transmission device may also be a 3K-II type planetary transmission device, at this moment, parameters of the compound planetary gears are identical, and the compound planetary gears can be machined into one gear.

A traditional 3K type planetary transmission device usually adopts a double-side-plate frame type planetary carrier, in the present disclosure, the planetary carrier of the traditional 3K type planetary transmission device is replaced with the above displacement planetary carrier system 8, the planetary gears 9, 10 press against the two inner gear rings 6, 7 with expansion of the planetary carrier 1 after being installed, backlashes can be effectively eliminated by such method for increasing orbital radii of the planetary gears, meanwhile, certain gear surface prepressure is applied between the planetary gears and the inner gear rings, and when tooth surfaces of the planetary gears 9, 10 or the inner gear rings 6, 7 are abraded, the planetary carrier can also be further adjusted to expand to keep tooth surface contact and tooth surface prepressure. Since the two inner gear rings share one group of planetary gears and one planetary carrier, the displacement planetary carrier system 8 has a more obvious effect of eliminating the backlashes and reducing vibration by outward pressing the planetary gears against the inner gear rings. Since the planetary carrier and the inner gear rings of the 3K type planetary transmission device have a high transmission ratio, a backlash between the sun gear 5 and the planetary gear 9 has a small influence on an output backlash caused when the planetary transmission device serves as a reducer.

In the application of the planetary transmission device according to the present disclosure serving as a planetary reducer used in a robot or precision automatic equipment, the output inner gear ring 7 is connected with an output shaft 16; and the sun gear 5 serves as a transmission high-speed end, and an input shaft 15 drives the sun gear 5 to drive the planetary gears to be engaged on the inner gear rings 6 and 7 in a rolling manner, so as to drive the displacement planetary carrier system 8 to rotate and drive the output inner gear ring 7 to drive the output shaft 16 to rotate. During actual assembly, firstly, the planetary gears 9, 10 and the displacement planetary carrier system 8 are installed in the inner gear rings 6, 7, the rigid tapered sleeve axial adjustment mechanism 3 is adjusted according to actual needs to allow the planetary gears to expand outward, and then the sun gear 5 is installed, so that the sun gear 5 better matched with the planetary gears can be selected, which is conducive to reducing the backlashes between the sun gear 5 and the planetary gear 9. Preferably, the planetary transmission device can be installed after the sun gear 5, the input shaft and other parts are pre-assembled or even processed into a whole. Transmission precision and other performance can be remarkably improved by replacing the planetary carrier with the displacement planetary carrier system according to the present disclosure on existing 3K type planetary reducers, including but not limited to a 3K-I type, a 3K-II type and a 3K-III type in the prior art.

Embodiment 3

Figure 8:
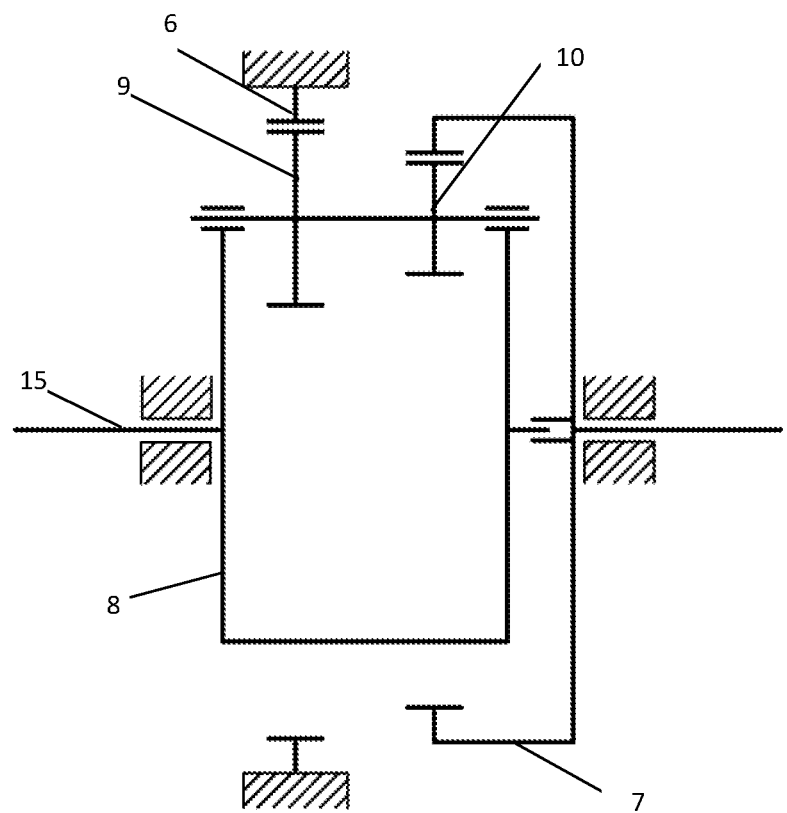
FIG. 8 is a simplified diagram showing a structural principle of a planetary transmission device in Embodiment 3 of the present disclosure.

As shown in FIG. 8, the present disclosure further discloses a planetary transmission device containing the displacement planetary carrier system. The planetary transmission device is a 3K type planetary transmission device without a sun gear, including a first inner gear ring 6, a second inner gear ring 7, compound planetary gears 9, 10, and the displacement planetary carrier system 8, wherein the displacement planetary carrier system 8 consists of the elastic planetary carrier 1, the rigid tapered sleeve 2 and the rigid tapered sleeve axial adjustment mechanism 3 shown in FIGS. 4-5, and the compound planetary gears include a first planetary gear 9 and a second planetary gear 10. The first inner gear ring 6 is engaged with the first planetary gear 9, and the second inner gear ring 7 is engaged with the second planetary gear 10.

Compared with the traditional 3K type planetary transmission device, the sun gear 5 is omitted in the planetary transmission device, and the planetary carrier of the traditional 3K type planetary transmission device is replaced with the above displacement planetary carrier system 8. A structure of the displacement planetary carrier system 8 is the same as that of Embodiment 1, which is not repeated here. Optionally, since parameters of the compound planetary gears in the planetary transmission device are identical, the compound planetary gears can be machined into one gear.

In the application of the planetary transmission device in the present embodiment serving as the planetary reducer used in the robot or precision automation equipment, the planetary gears 9, 10 press against the two inner gear rings 6, 7 with expansion of the planetary carrier 8 after being installed, backlashes can be effectively eliminated by such method for increasing orbital radii of the planetary gears, meanwhile, certain gear surface prepressure is applied between the planetary gears and the inner gear rings, and when tooth surfaces of the planetary gears 9, 10 and the inner gear rings 6, 7 are abraded, the planetary carrier can also be further adjusted to expand to keep tooth surface contact and tooth surface prepressure. The displacement planetary carrier system 8 serves as a transmission high-speed end, that is, an input shaft 15 is connected with the displacement planetary carrier system 8 to be used for directly driving the displacement planetary carrier system 8, torque is input from the displacement planetary carrier system 8 to drive the displacement planetary carrier system 8 to rotate, the planetary gears 9, 10 are driven to be engaged on the inner gear rings 6 and 7 in a rolling manner, and the output inner gear ring 7 is connected with an output shaft; and since the first planetary gear 9 and the second planetary gear 10 are duplicate gears installed on the displacement planetary carrier system 8 and rotating synchronously, the second planetary gear 10 drives the output inner gear ring 7 to drive the output shaft 16 to rotate.

In the present embodiment, the sun gear is omitted, which can avoid transmission backlashes caused by engagement between the sun gear 5 and the planetary gears 9, 10 and vibration caused thereby. End face key slots are formed in the outer wall of the elastic planetary carrier 1 and used for transmitting torque with the input shaft 15, and since the displacement planetary carrier system 8 can deform to expand, end face radial key slots or other structures are arranged on the elastic planetary carrier 1 to be used for still transmitting axial torque in a case of displacement of the planetary carrier.

Embodiment 4

Figure 9:
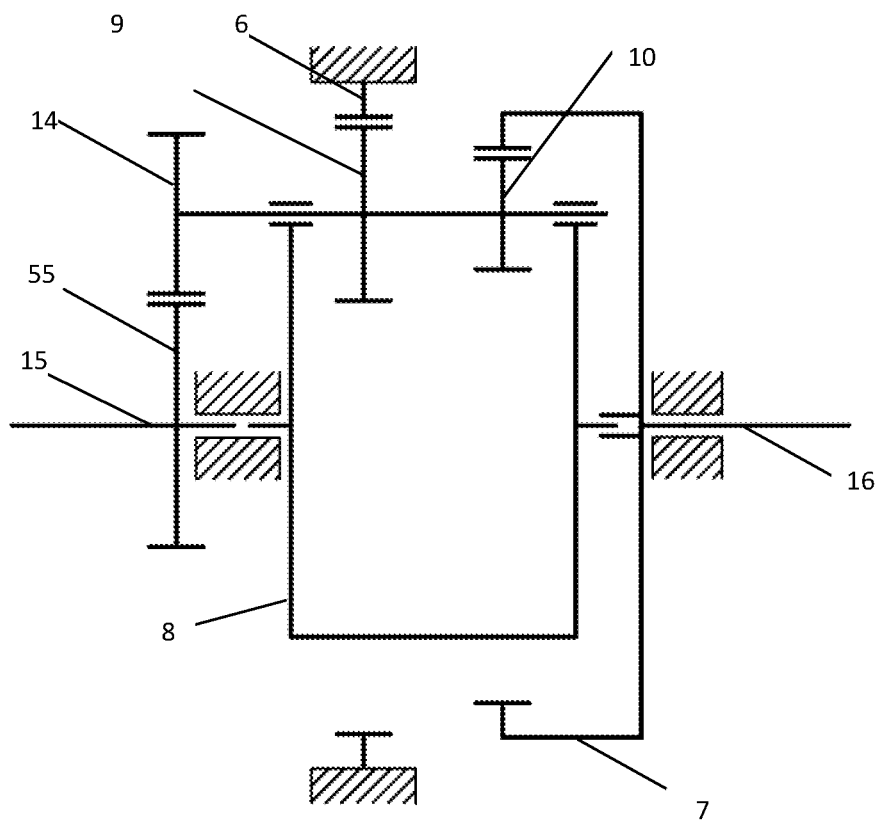
FIG. 9 is a simplified diagram showing a structural principle of a planetary transmission device in Embodiment 4 of the present disclosure.

As shown in FIG. 9, a planetary transmission device containing a displacement planetary carrier system is provided. The planetary transmission device has a structure similar to that of Embodiment 3, which is also based on the 3K type planetary transmission device without the sun gear, and includes a first inner gear ring 6, a second inner gear ring 7, a first planetary gear 9, a second planetary gear 10 and the displacement planetary carrier system 8. The structure the same as that of Embodiment 3 is not repeated herein, and only distinguishing features are described below. The planetary transmission device is further provided with additional third planetary gears 14 and an additional sun gear 55, the additional sun gear 55 is in engaged transmission with the third planetary gears 14, and the third planetary gears 14 and the first planetary gear 9 where the third planetary gears are located are coaxially installed and relatively fixed; and the additional sun gear of the planetary transmission device serves as an input end.

In the application of the planetary transmission device according to the present disclosure serving as a planetary reducer used in a robot or precision automatic equipment, the additional sun gear 55 serves as a high-speed input end, an input shaft 15 drives the additional sun gear 55, the additional sun gear 55 is in engaged transmission with the third planetary gears 14 to drive the third planetary gears 14 to auto-rotate, the first planetary gear 9 is driven to auto-rotate since the third planetary gears 14 and the first planetary gear 9 are coaxially and circumferentially fixed, meanwhile, the displacement planetary carrier system 8 is driven to make orbital revolution to drive the inner gear ring 7 to drive an output shaft 16 to rotate accordingly, and therefore the reducer achieves a transmission path similar to that of the traditional 3K type planetary transmission device. In the traditional 3K type planetary transmission structure, the planetary gears are engaged with the inner gear rings and the sun gear, so that parameters of all the gears are highly associated, and gear design difficulty and matching difficulty are high. However, by means of the structure that sun gear of the traditional 3K type planetary transmission device is omitted, and the additional planetary gears and the additional sun gear 55 are arranged on the planetary gears for engagement provided in the present embodiment, the requirements for gear parameter design can be reduced, which is conducive to optimally design torque load, reduction ratio, vibration, backlash and other performance of the transmission device to the maximum degree. Optionally, not all the planetary gears are provided with the additional planetary gears, for example, three or two of six planetary gears are provided with the additional planetary gears, and in order to better eliminate the backlashes and improve smoothness, the additional sun gear and the additional planetary gears can be designed by using a modulus smaller than that of the planetary gears engaged with the inner gear rings.

Embodiment 5

Figure 10:
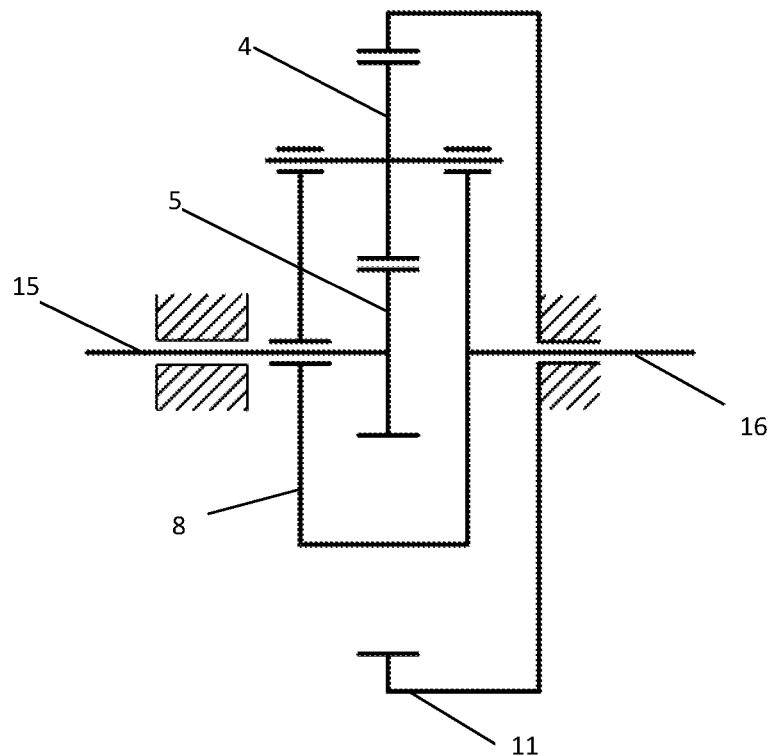
FIG. 10 is a simplified diagram showing a structural principle of a planetary transmission device in Embodiment 5 of the present disclosure.

As shown in FIG. 10, a planetary transmission device containing the displacement planetary carrier system is provided. The planetary transmission device is a 2K-H type planetary transmission device containing an inner gear ring, including the inner gear ring 11, a planetary gear 4, a sun gear 5 and the displacement planetary carrier system 8, wherein the displacement planetary carrier system 8 consists of the elastic planetary carrier 1, the rigid tapered sleeve 2 and the rigid tapered sleeve axial adjustment mechanism 3 shown in FIGS. 4-5. A structure of the displacement planetary carrier system 8 is the same as that of Embodiment 1, which is not repeated herein. The planetary gear 4 is engaged with the sun gear 5 and the inner gear ring 11, and the planetary gear 4 is installed on the displacement planetary carrier system 8. Although technical effects generated by selecting and using the displacement planetary carrier system in Embodiment 1 in the above 2K-H type planetary transmission device are not as obvious as those in the 3K type planetary transmission device, a backlash between the planetary gear and the inner gear ring is reduced, and certain prepressure is provided between the planetary gear and the inner gear ring, improving transmission precision and smoothness.

In the application of the planetary transmission device according to the present disclosure serving as a planetary reducer used in a robot or precision automatic equipment, the inner gear ring 11 is fixed, an input shaft 15 drives the sun gear 5 to drive the planetary gear 4 to be engaged on the inner gear ring 11 in a rolling manner, so as to drive the displacement planetary carrier system 8 to rotate, and the displacement planetary carrier system 8 and an output shaft 16 are circumferentially fixed to output torque. During actual assembly, firstly, the planetary gear 4 and the displacement planetary carrier system 8 are installed in the inner gear ring 11, the rigid tapered sleeve axial adjustment mechanism 3 of the displacement planetary carrier system 8 is adjusted, and then the sun gear is installed, so that the sun gear better matched with the planetary gear after the planetary gear expands outward can be selected and used, which is conducive to narrowing the backlash between the sun wheel and the planetary gear, and furthermore, the reducer can be installed after the sun gear, the input shaft and other parts are pre-assembled or even processed into a whole.

The planetary transmission device according to the present disclosure can further serve as an accelerator, and its structure is the same as that of the reducer, which is not repeated here.

The above embodiments are merely used for illustrating the technical solutions of the present disclosure instead of limiting them; although the present disclosure is illustrated in detail with reference to the above embodiments, those ordinarily skilled in the art should understand that they still can modify the technical solutions recorded in the above embodiments, or equivalently substitute part or all of technical features therein; and these modifications or substitutions cannot make the essence of the corresponding technical solutions depart from the scope of the technical solutions of the embodiments of the present disclosure; and non-essential improvements and modifications or substitutions made by those skilled in the art according to the content of the specification belong to the scope of protection of the present disclosure.

What is claimed is:

1. A displacement planetary carrier system, consisting of an elastic planetary carrier (1), a rigid tapered sleeve (2) and a rigid tapered sleeve axial adjustment mechanism (3); wherein
the elastic planetary carrier (1) is a planetary carrier in which part of an inner surface of a side wall is processed into tapered surfaces, the elastic planetary carrier (1) comprises first spaces (107) for containing planetary gears (4), a shaft or shaft hole for mounting the planetary gear (4) is formed in at least one axial end of each first space (107), staggered notches (103) are processed in the side wall, except for the first spaces (107), of the elastic planetary carrier (1), and the notches (103) are used for elastically increasing a perimeter of the side wall of the elastic planetary carrier (1) during force bearing, so that the elastic planetary carrier (1) elastically deforms;
the rigid tapered sleeve (2) is sleeved within the elastic planetary carrier (1), and tapered surfaces that match with the tapered surface of the inner surface of the side wall of the elastic planetary carrier (1) are processed on at least part of an outer side wall of the rigid tapered sleeve (2), so that the outer surface, processed with the tapered surfaces, of the rigid tapered sleeve (2) is in close fit with the inner surface, processed with the tapered surface, of the side wall of the elastic planetary carrier (1); and
the rigid tapered sleeve axial adjustment mechanism (3) is axially mounted on an adjusting bolt/nut or elastic element at an end portion of the elastic planetary carrier (1) and/or the rigid tapered sleeve (2) and used to apply axial force directed towards a minor diameter of the rigid tapered sleeve (2) to the rigid tapered sleeve (2), the planetary gears (4) arranged in the elastic planetary carrier (1) expand outward and press against inner gear rings (11) that mesh with the same by axially pushing, by the rigid tapered sleeve axial adjustment mechanism (3), the rigid tapered sleeve (2) to expand the elastic planetary carrier (1), so as to increase orbital radii of the planetary gears (4), thereby eliminating backlashes or applying gear surface prepressure between the planetary gears (4) and the inner gear rings (11).

2. The displacement planetary carrier system according to claim 1, wherein at least one pair of staggered notches (103) in an axial direction or radial direction of the elastic planetary carrier (1) are processed in the side wall, provided with the tapered surface, of the elastic planetary carrier (1), the two staggered notches (103) are opposite, and depths of each pair of staggered notches (103) are greater than wall thicknesses before the notches (103) are processed in notch positions of the elastic planetary carrier (1).

3. The displacement planetary carrier system according to claim 1, wherein second spaces (201) matched with the first spaces (107) are further arranged on the side wall of the rigid tapered sleeve (2) and used for containing the planetary gears (4) and/or sun gears (5).

4. The displacement planetary carrier system according to claim 1, wherein the rigid tapered sleeve axial adjustment mechanism (3) is an elastic leaf, an outer edge of the elastic leaf is fixed to an end face of the elastic planetary carrier (1) through a screw, an inner edge of the elastic leaf makes contact with a major diameter end face of the rigid tapered sleeve (2), and pressure towards the minor diameter of the rigid tapered sleeve (2) is generated to the rigid tapered sleeve (2) through elastic force of the elastic leaf.

5. The displacement planetary carrier system according to claim 4, wherein at least one protrusion or groove is formed in the major diameter end face of the rigid tapered sleeve (2) as a limiting mechanism, and a groove or protrusion corresponding to the limiting mechanism is arranged at a corresponding position of the elastic leaf and clamped with the protrusion or groove of the rigid tapered sleeve (2), so as to limit the rigid tapered sleeve (2) and the elastic planetary carrier (1) to circumferentially rotate relative to each other.

6. The displacement planetary carrier system according to claim 4, wherein a taper angle of the rigid tapered sleeve (2) ranges from 6° to 12°, so as to achieve a self-locking effect.

7. The displacement planetary carrier system according to claim 1, wherein a limiting mechanism is further arranged and used for limiting the rigid tapered sleeve (2) and the elastic planetary carrier (1) to circumferentially rotate relative to each other.

8. The displacement planetary carrier system according to claim 1, wherein the rigid tapered sleeve axial adjustment mechanism (3) is an adjusting nut, an external thread matched with the adjusting nut is processed on a minor diameter end portion of the rigid tapered sleeve (2), the adjusting nut is screwed into the external thread of the rigid tapered sleeve (2), so as to compress the end face of the elastic planetary carrier (1), and tension towards the minor diameter of the rigid tapered sleeve (2) is generated to the rigid tapered sleeve (2) by means of tension of the adjusting nut.

9. The displacement planetary carrier system according to claim 1, wherein the elastic planetary carrier (1) comprises an annular supporting top plate (105) and an annular supporting bottom plate (102), both of which are symmetrically arranged, a plurality of planetary carrier supporting columns (104) are arranged on an upper surface of the supporting bottom plate (102), and the annular supporting top plate (105) is arranged at tops of the planetary carrier supporting columns (104); tapered surfaces are processed on inner surfaces of the planetary carrier supporting columns (104), the annular supporting top plate (105) and the annular supporting bottom plate (102) respectively; and a pair of staggered notches (103) in the radial direction of the elastic planetary carrier (1) are processed at a position, on each planetary carrier supporting column (104), of the planetary carrier (4).

10. A planetary transmission device, wherein a planetary carrier in the planetary transmission device is the displacement planetary carrier system (8) according to claim 1, the planetary transmission device is a 3K planetary transmission device, planetary gears of the planetary transmission device expand outward and press against inner gear rings of the planetary transmission device by axially pushing, by the rigid tapered sleeve axial adjustment mechanism (3), the rigid tapered sleeve (2) to expand the clastic planetary carrier (1), so as to increase orbital radii of the planetary gears (4), thereby eliminating backlashes or applying gear surface prepressure between the planetary gears (4) and the inner gear rings (11).

11. The planetary transmission device according to claim 10, wherein at least one pair of staggered notches (103) in an axial direction or radial direction of the elastic planetary carrier (1) are processed in the side wall, provided with the tapered surface, of the elastic planetary carrier (1), the two staggered notches (103) are opposite, and depths of each pair of staggered notches (103) are greater than wall thicknesses before the notches (103) are processed in notch positions of the elastic planetary carrier (1).

12. The planetary transmission device according to claim 10, wherein second spaces (201) matched with the first spaces (107) are further arranged on the side wall of the rigid tapered sleeve (2) and used for containing the planetary gears (4) and/or sun gears (5).

13. The planetary transmission device according to claim 10, the rigid tapered sleeve axial adjustment mechanism (3) is an elastic leaf, an outer edge of the elastic leaf is fixed to an end face of the elastic planetary carrier (1) through a screw, an inner edge of the elastic leaf makes contact with a major diameter end face of the rigid tapered sleeve (2), and pressure towards the minor diameter of the rigid tapered sleeve (2) is generated to the rigid tapered sleeve (2) through elastic force of the elastic leaf.

14. The planetary transmission device according to claim 10, wherein a limiting mechanism is further arranged and used for limiting the rigid tapered sleeve (2) and the elastic planetary carrier (1) to circumferentially rotate relative to each other.

15. The planetary transmission device according to claim 10, wherein at least one protrusion or groove is formed in the major diameter end face of the rigid tapered sleeve (2) as a limiting mechanism, and a groove or protrusion corresponding to the limiting mechanism is arranged at a corresponding position of the elastic leaf and clamped with the protrusion or groove of the rigid tapered sleeve (2), so as to limit the rigid tapered sleeve (2) and the elastic planetary carrier (1) to circumferentially rotate relative to each other.

16. The planetary transmission device according to claim 10, wherein a taper angle of the rigid tapered sleeve (2) ranges from 6° to 12°, so as to achieve a self-locking effect.

17. The planetary transmission device according to claim 10, wherein the rigid tapered sleeve axial adjustment mechanism (3) is an adjusting nut, an external thread matched with the adjusting nut is processed on a minor diameter end portion of the rigid tapered sleeve (2), the adjusting nut is screwed into the external thread of the rigid tapered sleeve (2), so as to compress the end face of the elastic planetary carrier (1), and tension towards the minor diameter of the rigid tapered sleeve (2) is generated to the rigid tapered sleeve (2) by means of tension of the adjusting nut.

18. The planetary transmission device according to claim 10, wherein the elastic planetary carrier (1) comprises an annular supporting top plate (105) and an annular supporting bottom plate (102), both of which are symmetrically arranged, a plurality of planetary carrier supporting columns (104) are arranged on an upper surface of the supporting bottom plate (102), and the annular supporting top plate (105) is arranged at tops of the planetary carrier supporting columns (104); tapered surfaces are processed on inner surfaces of the planetary carrier supporting columns (104), the annular supporting top plate (105) and the annular supporting bottom plate (102) respectively; and a pair of staggered notches (103) in the radial direction of the elastic planetary carrier (1) are processed at a position, on each planetary carrier supporting column (104), of the planetary carrier (4).

19. A planetary transmission device, wherein a planetary carrier in the planetary transmission device is the displacement planetary carrier system (8) according to claim 1, the planetary transmission device is a 3K planetary transmission device without a sun gear, and the displacement planetary carrier system (8) of the planetary transmission device serves as an input end; and planetary gears of the planetary transmission device expand outward and press against inner gear rings (11) of the planetary transmission device by axially pushing, by the rigid tapered sleeve axial adjustment mechanism (3), the rigid tapered sleeve (2) to expand the elastic planetary carrier (1), so as to increase orbital radii of the planetary gears (4), thereby eliminating backlashes or applying gear surface prepressure between the planetary gears (4) and the inner gear rings (11).

20. The planetary transmission device according to claim 19, wherein at least one pair of staggered notches (103) in an axial direction or radial direction of the elastic planetary carrier (1) are processed in the side wall, provided with the tapered surface, of the elastic planetary carrier (1), the two staggered notches (103) are opposite, and depths of each pair of staggered notches (103) are greater than wall thicknesses before the notches (103) are processed in notch positions of the elastic planetary carrier (1).

21. The planetary transmission device according to claim 19, wherein second spaces (201) matched with the first spaces (107) are further arranged on the side wall of the rigid tapered sleeve (2) and used for containing the planetary gears (4) and/or sun gears (5).

22. The planetary transmission device according to claim 19, the rigid tapered sleeve axial adjustment mechanism (3) is an elastic leaf, an outer edge of the elastic leaf is fixed to an end face of the elastic planetary carrier (1) through a screw, an inner edge of the elastic leaf makes contact with a major diameter end face of the rigid tapered sleeve (2), and pressure towards the minor diameter of the rigid tapered sleeve (2) is generated to the rigid tapered sleeve (2) through elastic force of the elastic leaf.

23. The planetary transmission device according to claim 19, wherein a limiting mechanism is further arranged and used for limiting the rigid tapered sleeve (2) and the elastic planetary carrier (1) to circumferentially rotate relative to each other.

24. The planetary transmission device according to claim 19, wherein at least one protrusion or groove is formed in the major diameter end face of the rigid tapered sleeve (2) as a limiting mechanism, and a groove or protrusion corresponding to the limiting mechanism is arranged at a corresponding position of the elastic leaf and clamped with the protrusion or groove of the rigid tapered sleeve (2), so as to limit the rigid tapered sleeve (2) and the elastic planetary carrier (1) to circumferentially rotate relative to each other.

25. The planetary transmission device according to claim 19, wherein a taper angle of the rigid tapered sleeve (2) ranges from 6° to 12°, so as to achieve a self-locking effect.

26. The planetary transmission device according to claim 19, wherein the rigid tapered sleeve axial adjustment mechanism (3) is an adjusting nut, an external thread matched with the adjusting nut is processed on a minor diameter end portion of the rigid tapered sleeve (2), the adjusting nut is screwed into the external thread of the rigid tapered sleeve (2), so as to compress the end face of the elastic planetary carrier (1), and tension towards the minor diameter of the rigid tapered sleeve (2) is generated to the rigid tapered sleeve (2) by means of tension of the adjusting nut.

27. The planetary transmission device according to claim 19, wherein the elastic planetary carrier (1) comprises an annular supporting top plate (105) and an annular supporting bottom plate (102), both of which are symmetrically arranged, a plurality of planetary carrier supporting columns (104) are arranged on an upper surface of the supporting bottom plate (102), and the annular supporting top plate (105) is arranged at tops of the planetary carrier supporting columns (104); tapered surfaces are processed on inner surfaces of the planetary carrier supporting columns (104), the annular supporting top plate (105) and the annular supporting bottom plate (102) respectively; and a pair of staggered notches (103) in the radial direction of the elastic planetary carrier (1) are processed at a position, on each planetary carrier supporting column (104), of the planetary carrier (4).

28. A planetary transmission device, wherein a planetary carrier in the planetary transmission device is the displacement planetary carrier system (8) according to claim 1, the planetary transmission device is further provided with an additional sun gear (55) and at least two additional third planetary gears (14) on the basis of a 3K planetary transmission device without a sun gear (5), the additional sun gear (55) and the third planetary gears (14) are in engaged transmission to drive the third planetary gears (14) to auto-rotate, each third planetary gear (14) and one planetary gear (4) of the planetary transmission device are coaxially mounted and relatively fixed, and the additional sun gear (55) of the planetary transmission device serves as an input end; and planetary gears (4) of the planetary transmission device expand outward and press against inner gear rings (11) of the planetary transmission device by axially pushing, by the rigid tapered sleeve axial adjustment mechanism (3), the rigid tapered sleeve (2) to expand the elastic planetary carrier (1), so as to increase orbital radii of the planetary gears (4), thereby eliminating backlashes or applying gear surface prepressure between the planetary gears (4) and the inner gear rings (11).

29. The planetary transmission device according to claim 28, wherein at least one pair of staggered notches (103) in an axial direction or radial direction of the elastic planetary carrier (1) are processed in the side wall, provided with the tapered surface, of the elastic planetary carrier (1), the two staggered notches (103) are opposite, and depths of each pair of staggered notches (103) are greater than wall thicknesses before the notches (103) are processed in notch positions of the elastic planetary carrier (1).

30. The planetary transmission device according to claim 28, wherein second spaces (201) matched with the first spaces (107) are further arranged on the side wall of the rigid tapered sleeve (2) and used for containing the planetary gears (4) and/or sun gears (5).

31. The planetary transmission device according to claim 28, the rigid tapered sleeve axial adjustment mechanism (3) is an elastic leaf, an outer edge of the elastic leaf is fixed to an end face of the elastic planetary carrier (1) through a screw, an inner edge of the elastic leaf makes contact with a major diameter end face of the rigid tapered sleeve (2), and pressure towards the minor diameter of the rigid tapered sleeve (2) is generated to the rigid tapered sleeve (2) through elastic force of the elastic leaf.

32. The planetary transmission device according to claim 28, wherein a limiting mechanism is further arranged and used for limiting the rigid tapered sleeve (2) and the elastic planetary carrier (1) to circumferentially rotate relative to each other.

33. The planetary transmission device according to claim 28, wherein at least one protrusion or groove is formed in the major diameter end face of the rigid tapered sleeve (2) as a limiting mechanism, and a groove or protrusion corresponding to the limiting mechanism is arranged at a corresponding position of the elastic leaf and clamped with the protrusion or groove of the rigid tapered sleeve (2), so as to limit the rigid tapered sleeve (2) and the elastic planetary carrier (1) to circumferentially rotate relative to each other.

34. The planetary transmission device according to claim 28, wherein a taper angle of the rigid tapered sleeve (2) ranges from 6° to 12°, so as to achieve a self-locking effect.

35. The planetary transmission device according to claim 28, wherein the rigid tapered sleeve axial adjustment mechanism (3) is an adjusting nut, an external thread matched with the adjusting nut is processed on a minor diameter end portion of the rigid tapered sleeve (2), the adjusting nut is screwed into the external thread of the rigid tapered sleeve (2), so as to compress the end face of the elastic planetary carrier (1), and tension towards the minor diameter of the rigid tapered sleeve (2) is generated to the rigid tapered sleeve (2) by means of tension of the adjusting nut.

36. The planetary transmission device according to claim 28, wherein the elastic planetary carrier (1) comprises an annular supporting top plate (105) and an annular supporting bottom plate (102), both of which are symmetrically arranged, a plurality of planetary carrier supporting columns (104) are arranged on an upper surface of the supporting bottom plate (102), and the annular supporting top plate (105) is arranged at tops of the planetary carrier supporting columns (104); tapered surfaces are processed on inner surfaces of the planetary carrier supporting columns (104), the annular supporting top plate (105) and the annular supporting bottom plate (102) respectively; and a pair of staggered notches (103) in the radial direction of the elastic planetary carrier (1) are processed at a position, on each planetary carrier supporting column (104), of the planetary carrier (4).

37. A planetary transmission device, wherein a planetary carrier in the planetary transmission device is the displacement planetary carrier system (8) according to claim 1, the planetary transmission device is a 2K-H planetary transmission device with an inner gear ring (11), a planetary gear (4) of the planetary transmission device expands outward and presses against the inner gear ring (11) of the planetary transmission device by axially pushing, by the rigid tapered sleeve axial adjustment mechanism (3), a rigid tapered sleeve (2) to expand the elastic planetary carrier (1), so as to increase an orbital radius of the planetary gear (4), thereby eliminating a backlash or applying gear surface prepressure between the planetary gear (4) and the inner gear ring (11).

38. The planetary transmission device according to claim 37, wherein at least one pair of staggered notches (103) in an axial direction or radial direction of the elastic planetary carrier (1) are processed in the side wall, provided with the tapered surface, of the elastic planetary carrier (1), the two staggered notches (103) are opposite, and depths of each pair of staggered notches (103) are greater than wall thicknesses before the notches (103) are processed in notch positions of the elastic planetary carrier (1).

39. The planetary transmission device according to claim 37, wherein second spaces (201) matched with the first spaces (107) are further arranged on the side wall of the rigid tapered sleeve (2) and used for containing the planetary gears (4) and/or sun gears (5).

40. The planetary transmission device according to claim 37, the rigid tapered sleeve axial adjustment mechanism (3) is an elastic leaf, an outer edge of the elastic leaf is fixed to an end face of the elastic planetary carrier (1) through a screw, an inner edge of the elastic leaf makes contact with a major diameter end face of the rigid tapered sleeve (2), and pressure towards the minor diameter of the rigid tapered sleeve (2) is generated to the rigid tapered sleeve (2) through elastic force of the elastic leaf.

41. The planetary transmission device according to claim 37, wherein a limiting mechanism is further arranged and used for limiting the rigid tapered sleeve (2) and the elastic planetary carrier (1) to circumferentially rotate relative to each other.

42. The planetary transmission device according to claim 37, wherein at least one protrusion or groove is formed in the major diameter end face of the rigid tapered sleeve (2) as a limiting mechanism, and a groove or protrusion corresponding to the limiting mechanism is arranged at a corresponding position of the elastic leaf and clamped with the protrusion or groove of the rigid tapered sleeve (2), so as to limit the rigid tapered sleeve (2) and the elastic planetary carrier (1) to circumferentially rotate relative to each other.

43. The planetary transmission device according to claim 37, wherein a taper angle of the rigid tapered sleeve (2) ranges from 6° to 12°, so as to achieve a self-locking effect.

44. The planetary transmission device according to claim 37, wherein the rigid tapered sleeve axial adjustment mechanism (3) is an adjusting nut, an external thread matched with the adjusting nut is processed on a minor diameter end portion of the rigid tapered sleeve (2), the adjusting nut is screwed into the external thread of the rigid tapered sleeve (2), so as to compress the end face of the elastic planetary carrier (1), and tension towards the minor diameter of the rigid tapered sleeve (2) is generated to the rigid tapered sleeve (2) by means of tension of the adjusting nut.

45. The planetary transmission device according to claim 37, wherein the elastic planetary carrier (1) comprises an annular supporting top plate (105) and an annular supporting bottom plate (102), both of which are symmetrically arranged, a plurality of planetary carrier supporting columns (104) are arranged on an upper surface of the supporting bottom plate (102), and the annular supporting top plate (105) is arranged at tops of the planetary carrier supporting columns (104); tapered surfaces are processed on inner surfaces of the planetary carrier supporting columns (104), the annular supporting top plate (105) and the annular supporting bottom plate (102) respectively; and a pair of staggered notches (103) in the radial direction of the elastic planetary carrier (1) are processed at a position, on each planetary carrier supporting column (104), of the planetary carrier (4).

* * * * *